US012806658B2

(12) United States Patent
McIver et al.

(10) Patent No.: US 12,806,658 B2
(45) Date of Patent: Nov. 24, 2026

(54) SYSTEMS AND METHODS FOR CLEANING CERAMIC MATRIX FROM A COMPACTION ROLLER

(71) Applicant: The Boeing Company, Arlington, VA (US)

(72) Inventors: Carl R. McIver, Everett, WA (US); Brice A. Johnson, Toledo, WA (US); Sangvavann Heng, Buena Park, CA (US)

(73) Assignee: The Boeing Company, Arlington, VA (US)

( * ) Notice: Subject to any disclaimer, the term of this patent is extended or adjusted under 35 U.S.C. 154(b) by 61 days.

(21) Appl. No.: 18/892,730

(22) Filed: Sep. 23, 2024

(65) Prior Publication Data

US 2025/0170616 A1 May 29, 2025

Related U.S. Application Data

(60) Provisional application No. 63/603,771, filed on Nov. 29, 2023.

(51) Int. Cl.

| | |
|---|---|
| ***B08B 1/34*** | (2024.01) |
| ***B08B 1/16*** | (2024.01) |
| ***B08B 1/20*** | (2024.01) |
| ***B08B 1/54*** | (2024.01) |
| ***B08B 3/04*** | (2006.01) |
| ***B08B 3/14*** | (2006.01) |
| ***B28B 3/12*** | (2006.01) |

(52) U.S. Cl.

CPC ................ *B08B 1/34* (2024.01); *B08B 1/165* (2024.01); *B08B 1/20* (2024.01); *B08B 1/54* (2024.01); *B08B 3/041* (2013.01); *B08B 3/14* (2013.01); *B28B 3/12* (2013.01)

(58) Field of Classification Search

None

See application file for complete search history.

(56) References Cited

U.S. PATENT DOCUMENTS

| | | | |
|---|---|---|---|
| 3,274,633 A | 9/1966 | Stevenson | |
| 2015/0022600 A1 | 1/2015 | Numata | |
| 2019/0169724 A1 * | 6/2019 | Coyle | ..................... B32B 18/00 |

FOREIGN PATENT DOCUMENTS

| | | | |
|---|---|---|---|
| DE | 1974282 A1 | | 4/1999 |
| DE | 102012002900 A1 | | 8/2013 |
| DE | 102021004224 B3 | * | 10/2022 |
| DE | 202023100032 U1 | | 2/2023 |
| EP | 4124393 A1 | | 2/2023 |
| WO | 9960210 A1 | | 11/1999 |

OTHER PUBLICATIONS

European Patent Office, Netherlands Search Report and Written Opinion, NL App. No. 2036859 (Jul. 5, 2024).

European Patent Office, Extended European Search Report, App. No. 24202439.6 (Mar. 14, 2025).

* cited by examiner

*Primary Examiner* — Kaj K Olsen

*Assistant Examiner* — Richard Z. Zhang

(74) *Attorney, Agent, or Firm* — Walters & Wasylyna LLC

(57) ABSTRACT

A method for cleaning a ceramic matrix from a compaction roller includes steps of: (1) applying a cleaning fluid to the compaction roller; (2) scrubbing the compaction roller to remove ceramic particles of the ceramic matrix from a compaction-roller surface of the compaction roller, and (3) drying the compaction roller to remove the cleaning fluid from the compaction-roller surface.

20 Claims, 7 Drawing Sheets

SYSTEMS AND METHODS FOR CLEANING CERAMIC MATRIX FROM A COMPACTION ROLLER

PRIORITY

This application claims priority from U.S. Ser. No. 63/603,771 filed on Nov. 29, 2023, the entire contents of which are incorporated herein by reference.

GOVERNMENT RIGHTS

This invention was made with Government support under contract number FA8650-17-C-5700 awarded by Department of Defense. The government has certain rights in this invention.

FIELD

The present disclosure relates generally to composite manufacturing and, more particularly, to systems and methods for cleaning a ceramic matrix from the surface of a compaction roller used for compacting ceramic matrix composite materials.

BACKGROUND

Currently, compaction of ceramic matrix composite plies on layup tools is a manual operation performed using hand pressure, sweeping, and vacuum bagging techniques. This results in variable quality and inconsistencies in the compaction. These manual operations require skilled technicians, are time intensive, require inspection and rework, and lead to overall increased life cycle time for compaction of the ceramic matrix composite ply. Improvements in ceramic matrix composite compaction utilize specialized compaction rollers to compact the ceramic matrix composite plies. However, remnants and other debris from the ceramic matrix composite plies can remain on the surface of the compaction roller after compaction, which should be removed before a subsequent compacting operation. Accordingly, those skilled in the art continue with research and development efforts in ceramic matrix composite manufacturing.

SUMMARY

Disclosed are examples of a method for cleaning a ceramic matrix from a compaction roller and a system for compacting a ceramic composite material. The following is a non-exhaustive list of examples, which may or may not be claimed, of the subject matter according to the present disclosure.

In an example, the disclosed method includes steps of: (1) applying a cleaning fluid to a scrubbing roller; (2) placing a compaction roller in contact with the scrubbing roller such that a compaction-roller axis of the compaction roller is oblique to a scrubbing-roller axis of the scrubbing roller; (3) with the compaction roller in contact with the scrubbing roller and the compaction-roller axis oblique to the scrubbing-roller axis, rotating the scrubbing roller 106 about the scrubbing-roller axis; (4) rotating the compaction roller about the compaction-roller axis in response to rotating of the scrubbing roller; (5) moving the compaction roller in a scrubbing direction that is non-parallel to the scrubbing-roller axis in response to rotating the scrubbing roller; (6) transferring the cleaning fluid from the scrubbing roller to the compaction roller while rotating the scrubbing roller; and (7) transferring debris from the compaction roller to the scrubbing roller while rotating the scrubbing roller.

In another example, the disclosed method includes steps of: (1) applying a cleaning fluid to a compaction roller; (2) scrubbing the compaction roller to remove ceramic particles of the ceramic matrix from a compaction-roller surface of the compaction roller; and (3) drying the compaction roller to remove the cleaning fluid from the compaction-roller surface.

In an example, the disclosed system includes a scrubbing roller and a drying roller. The scrubbing roller rotates about a scrubbing-roller axis to apply a cleaning fluid to a compaction roller and remove debris from the compaction roller. The drying roller rotates about a drying-roller axis to remove the cleaning fluid and the debris from the compaction roller. With the compaction roller placed in contact with the scrubbing roller and the scrubbing-roller axis oblique to a compaction-roller axis of the compaction roller, rotation of the scrubbing roller about the scrubbing-roller axis rotates the compaction roller about the compaction-roller axis and moves the compaction roller in a scrubbing direction that is non-parallel to the scrubbing-roller axis. With the compaction roller placed in contact with the drying roller and the drying-roller axis oblique to the compaction-roller axis of the compaction roller, rotation of the drying roller about the drying-roller axis rotates the compaction roller about the compaction-roller axis and moves the compaction roller in a drying direction that is non-parallel to the drying-roller axis.

Other examples of the system and the method will become apparent from the following detailed description, the accompanying drawings, and the appended claims.

DETAILED DESCRIPTION

Referring generally to FIGS. 1-6, by way of examples, the present disclosure is directed to a method and a system for cleaning ceramic matrix of a ceramic matrix composite from a compaction roller used during ceramic matrix composite (CMC) manufacturing. While examples of the method and system provide particular advantages and benefits related to manufacturing ceramic matrix composite structures, the method and system can also be used to clean rollers used in manufacturing other polymer and non-polymer composite structures.

Figure 2:
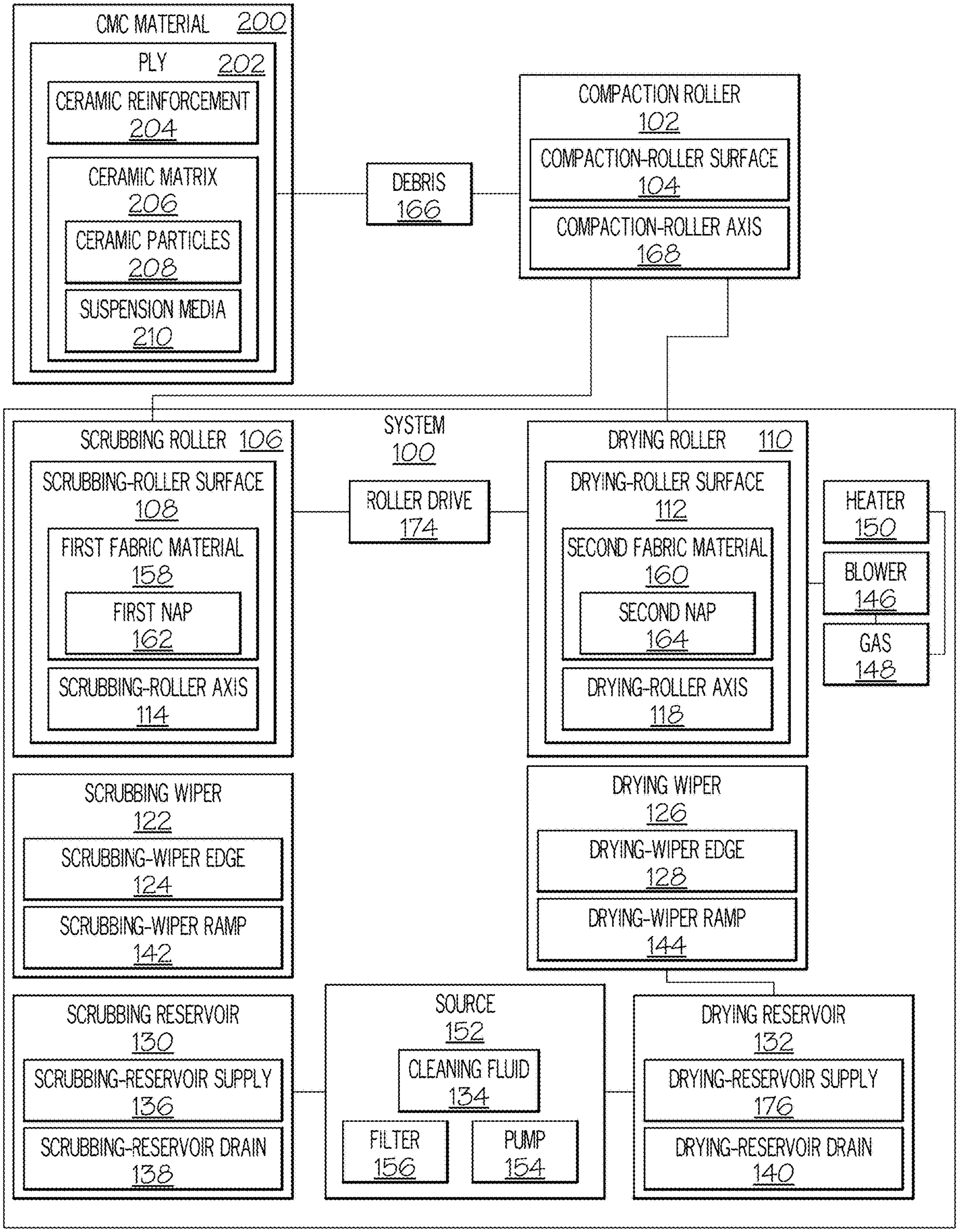
FIG. 2 is a schematic block diagram of an example of a system for cleaning a ceramic matrix from a compaction roller.

Referring to FIG. 2, ceramic matrix composites (CMCs) are a subgroup of composite materials and a subgroup of ceramics. CMCs include ceramic fibers embedded in a ceramic matrix. Both the fibers and the matrix can include any ceramic material, including carbon and carbon fibers. In one or more examples, a ceramic matrix composite (CMC) material 200 is a ceramic composite and includes a ceramic reinforcement 204 and a ceramic matrix 206.

In one or more examples, the ceramic reinforcement 204 is pre-impregnated with the ceramic matrix 206. In such examples, a ply 202 of the ceramic matrix composite material 200 can also be referred to as a CMC prepreg.

In one or more examples, the ceramic reinforcement 204 includes at least one of carbon reinforcement fibers, silicon carbide reinforcement fibers, alumina reinforcement fibers, alumina silica reinforcement fibers, aluminum nitride reinforcing fibers, silicon nitride reinforcement fibers, mullite reinforcement fibers, silica/quartz reinforcement fibers, basalt reinforcement fibers, and zirconia reinforcement fibers. Other suitable reinforcement materials are also contemplated for use as the ceramic reinforcement 204.

In one or more examples, the ceramic matrix 206 includes at least one of a carbon matrix, a silicon carbide matrix, an alumina matrix, an alumina silica matrix, an aluminum nitride matrix, a silicon nitride matrix, a mullite matrix, a geo-polymer matrix, and a zirconia matrix. Other suitable matrix materials are also contemplated for use as the ceramic matrix 206.

In one or more examples, the ceramic matrix 206 includes ceramic particles 208 dispersed in a suspension media 210 (e.g., fluid or other vehicle). In one or more examples, the ceramic matrix 206 is an aqueous suspension (e.g., the suspension media 210 includes an aqueous media). In one or more examples, the ceramic matrix 206 is a non-aqueous suspension (e.g., the suspension media 210 includes a non-aqueous media). The ceramic matrix 206 has various viscosities depending on the suspension media 210 used. In one or more examples, the ceramic particles 208 include at least one of carbon particles, silicon carbide particles, alumina particles, alumina silica particles, aluminum nitride particles, silicon nitride particles, mullite particles, geo-polymer particles, and zirconia particles. Other suitable materials are also contemplated for use as the ceramic particles 208.

Typically, the reinforcement material (e.g., ceramic reinforcement 204) of a fabric-based ceramic matrix composite is more brittle and stiffer than the reinforcement material of a fabric-based polymer matrix composite (PMC). Additionally, the matrix material (e.g., ceramic matrix 206) of a fabric-based ceramic matrix composite is less viscous than the matrix material of a fabric-based polymer matrix composite. As such, traditional compaction techniques and tools used with polymer matrix composites are not suitable for use with ceramic matrix composites.

The present disclosure recognizes that Pick-and-Place (PnP) robotic layup of fabric-based ceramic matrix composites (e.g., CMC prepregs) requires ply and splice compaction during layup for removing air pockets and wrinkles and to conform the prepreg to a tool before each subsequent ply is applied. As such, the present disclosure also recognizes the advantages of using a compaction roller 102 having specialized material characteristics to compact CMC plies in a similar manner to a smoothing process used during manual layup and that addresses the compaction needs for CMC manufacturing.

In one or more examples, a material for the compaction roller 102 is selected such that the CMC prepreg can be compacted using the compaction roller 102 without migration of the ceramic matrix 206 and without undesired distortion (e.g., wrinkling) of the fabric weave of the ceramic reinforcement 204 of the CMC prepreg. In one or more examples, the compaction roller 102 includes a compaction-roller axis 168 and a compaction-roller surface 104 that circumscribes the compaction-roller axis 168. In one or more examples, the compaction roller 102 includes a core and a covering that surrounds the core. In one or more examples, a covering material of the covering includes one of a foam material, a closed-cell foam material, or an inflatable bladder. In one or more examples, the covering material of the covering is impermeable. In one or more examples, the covering material includes at least one of silicone, urethane, polyurethane, and latex. In one or more examples, the covering material of the compaction roller 102 includes a Shore A hardness of between approximately 1 and 10, such as between approximately 3 and 7, such as approximately 5. Advantageously, the compliance of the roller material of the compaction roller provides pressure uniformity without localized high pressure peaks. The softness of the roller material allows for smoothing of the CMC prepreg without reinforcement distortion or matrix migration, while effectively eliminating large, trapped air bubbles.

The present disclosure recognizes that during compaction of the ply 202 of the CMC material 200, some amount of debris 166, such as from the ply 202 of the CMC material 200 or other foreign objects, may remain on the compaction-roller surface 104 of the compaction roller 102. The debris 166 can include amounts of the ceramic matrix 206, such as amounts of the ceramic particles 208 and/or the suspension media 210. The debris 166 can also include fragments of the ceramic reinforcement 204. As such, examples of the method and the system disclosed herein provide techniques and mechanisms for easily and efficiently cleaning the compaction-roller surface 104 of the compaction roller 102 after CMC ply compaction.

Figure 1:
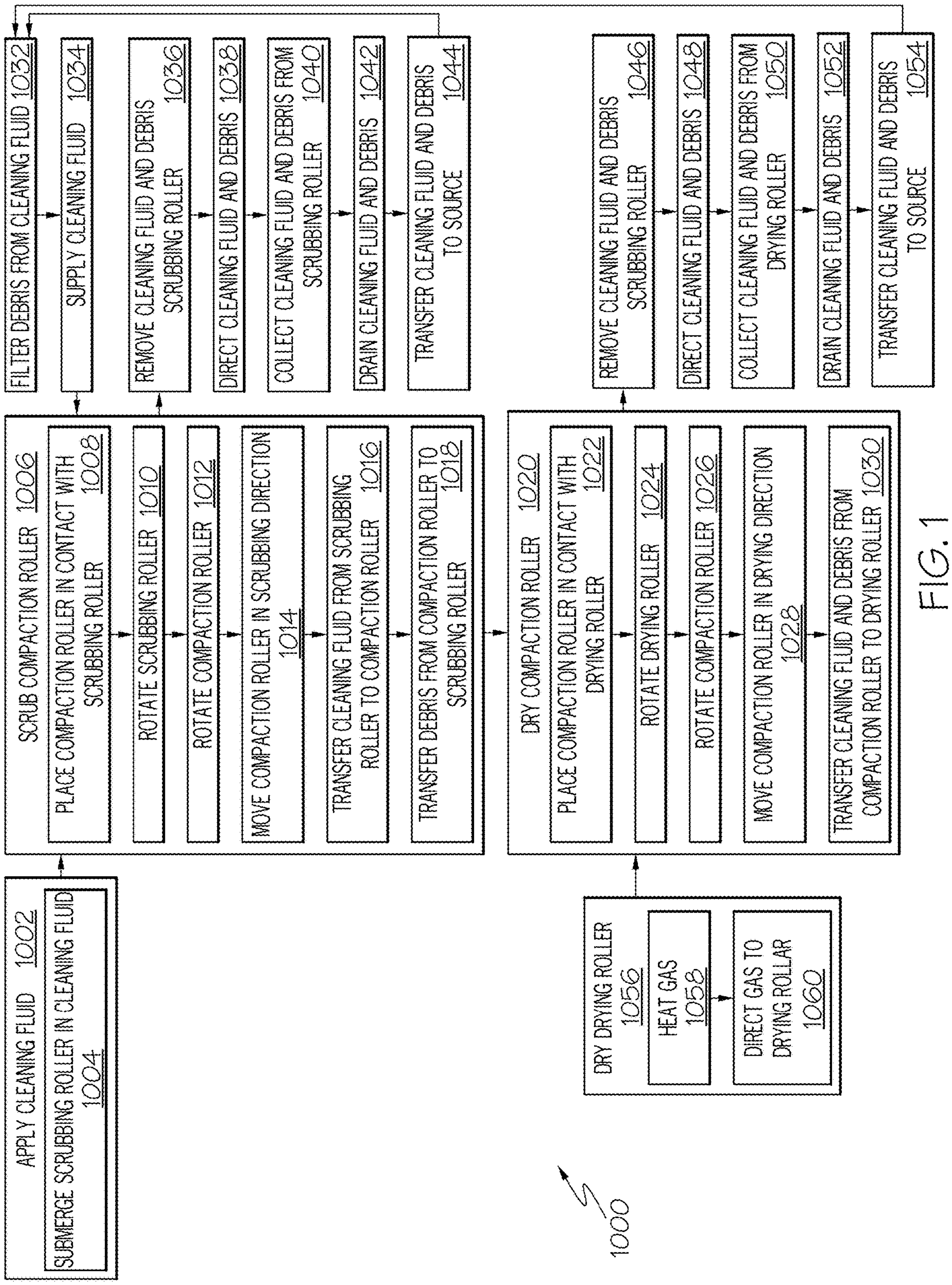
FIG. 1 is a flow diagram of an example of a method for cleaning a ceramic matrix from a compaction roller.
Figure 3:
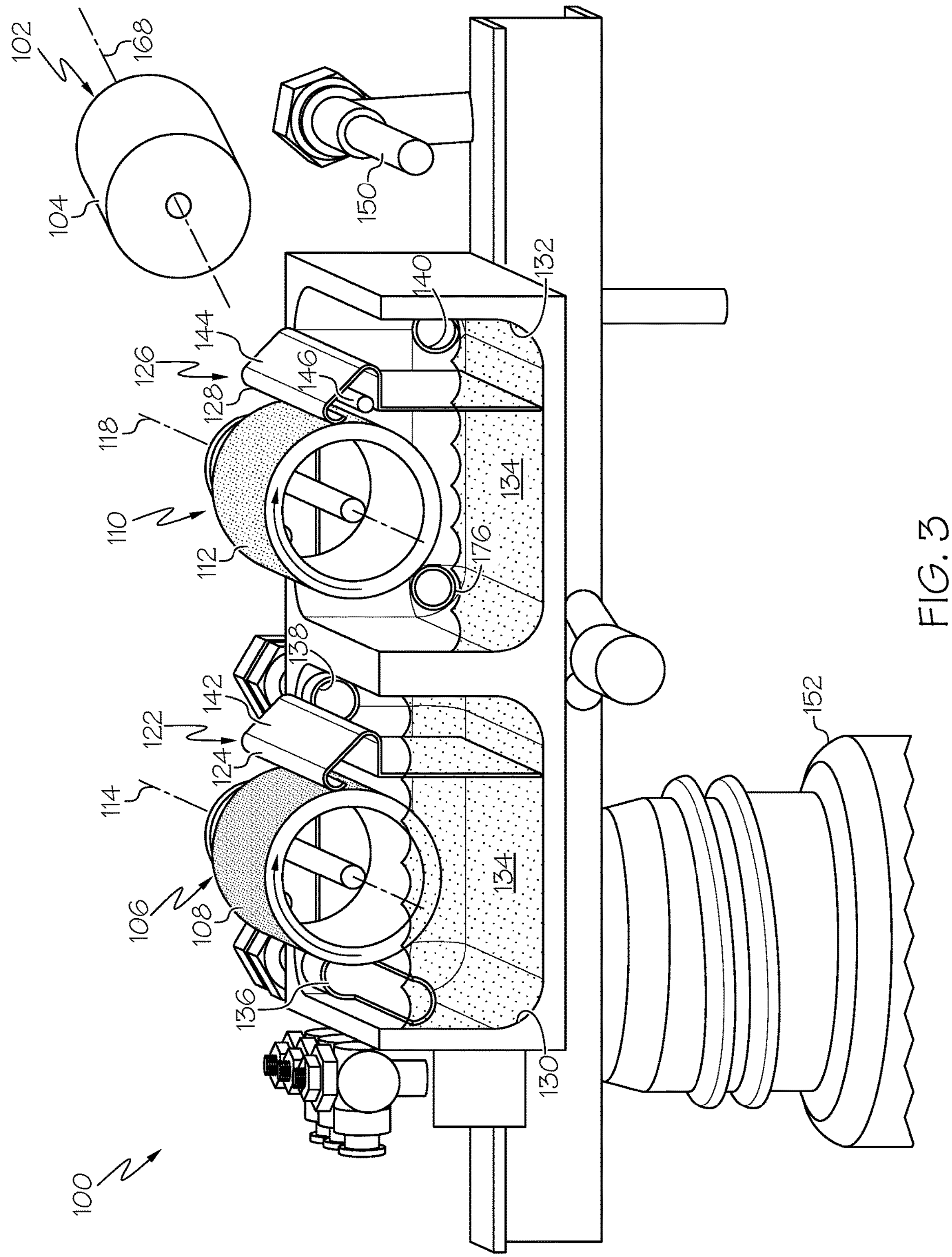
FIG. 3 is a schematic, elevational view, in partial section, of an example of system for cleaning a compaction roller.
Figure 4:
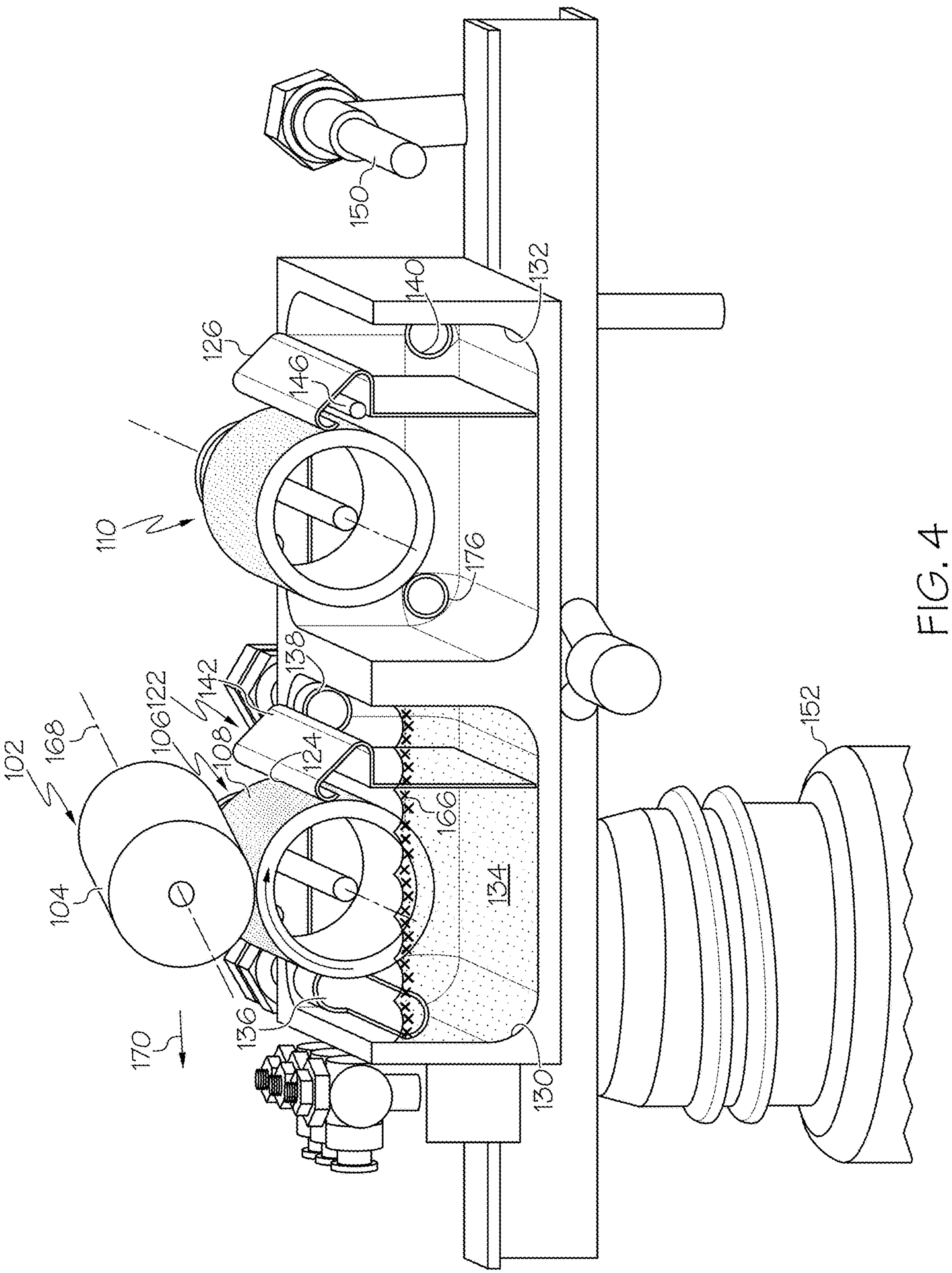
FIG. 4 is a schematic, elevational view, in partial section, of an example of the system.
Figure 5:
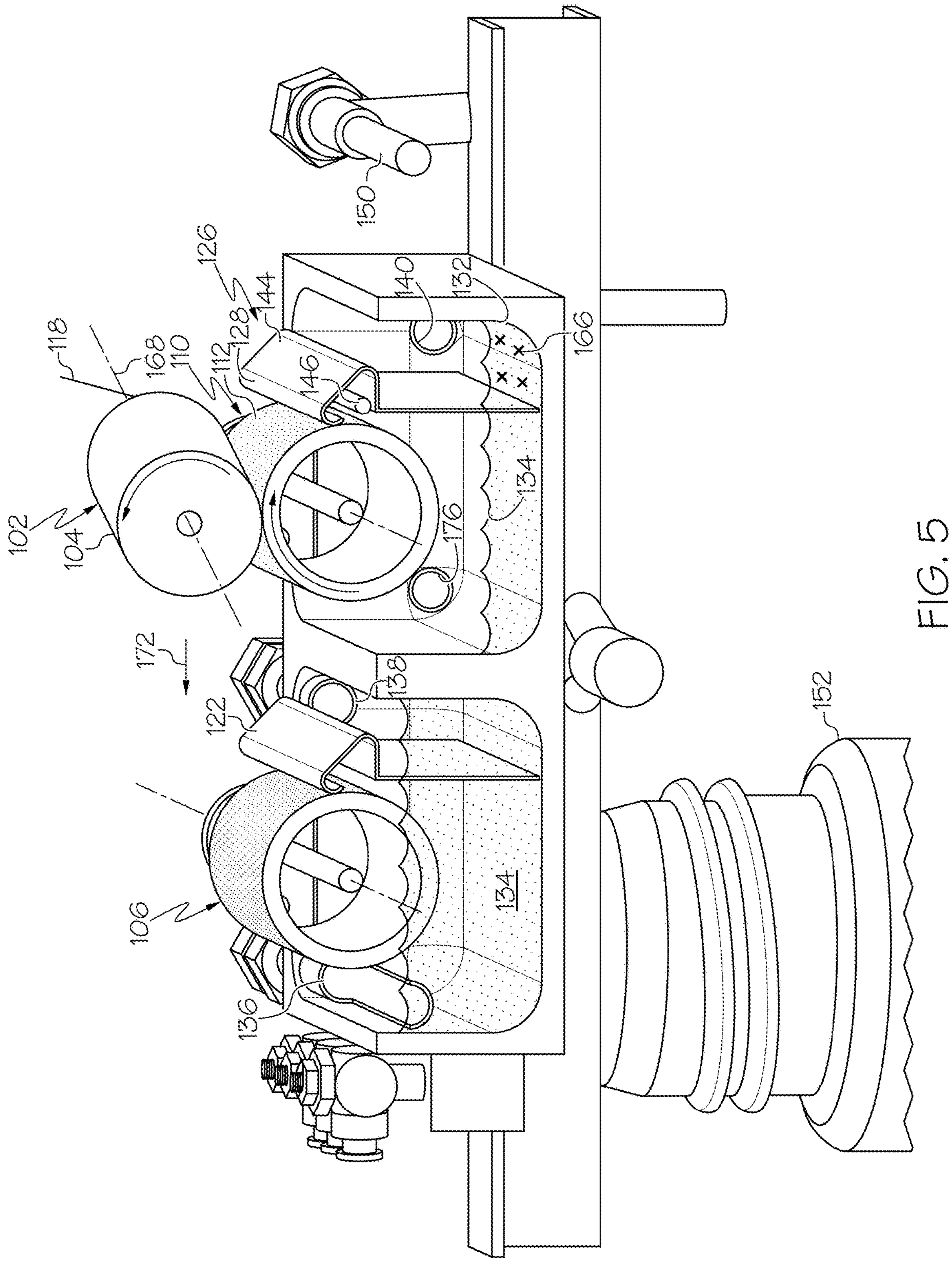
FIG. 5 is a schematic, elevational view, in partial section, of an example of the system.
Figure 6:
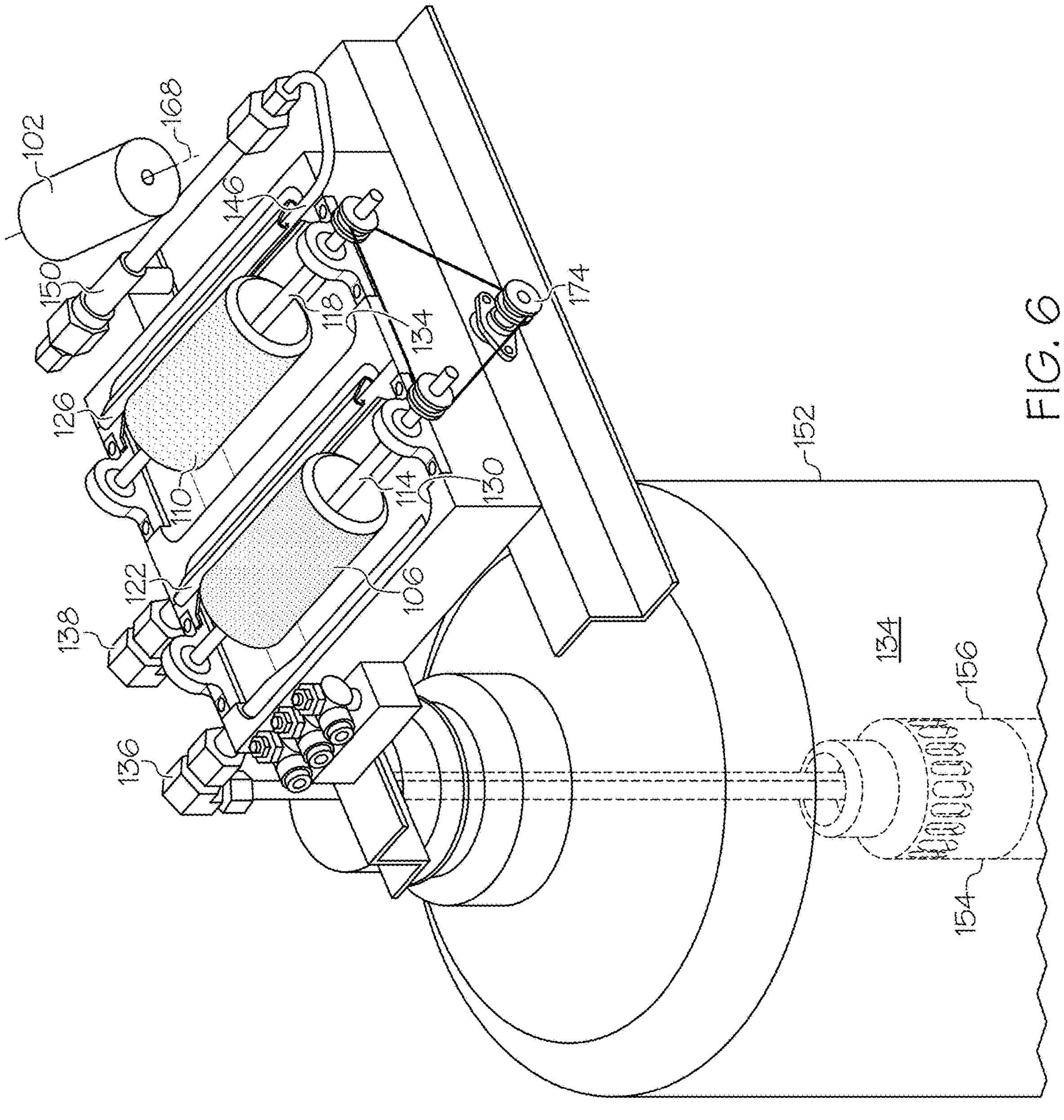
FIG. 6 is a schematic, perspective view of an example of the system.

FIG. 1 is a flow diagram illustrating an example of a method 1000 for cleaning the ceramic matrix 206 from the compaction roller 102. FIG. 2 is a schematic block diagram of an example of a system 100 for cleaning the ceramic matrix 206 from the compaction roller 102. FIG. 3 schematically illustrates an example of the system 100. FIG. 4 schematically illustrates an example of the system 100 during a portion of a scrubbing step of the method 1000. FIG. 5 schematically illustrates an example of the system 100 during a portion of a drying step of the method 1000. FIG. 6 schematically illustrates an example of the system 100.

In various examples, the system 100 and the method 1000 utilize two fabric-covered and driven rollers. A first one of the rollers (e.g., scrubbing roller) is kept wet and is used for cleaning the compaction roller 102. A second one of the rollers (e.g., drying roller) is kept dry and is used for drying the compaction roller 102. During the cleaning and drying operations, the compaction roller 102 is freewheeling and is independently mounted and moves across the driven scrubbing and drying rollers in such a way that the movement is at least approximately perpendicular to the axes if the scrubbing and drying roller but the axis of the compaction roller 102 is at a slight angle to the axes of the driven scrubbing and drying rollers. In this way, the driven scrubbing and drying rollers turn the freewheeling compaction roller 102 and the driving angle between the axes results in an angular scrubbing motion and drying motion, which allows the driving scrubbing and drying rollers to clean and dry the freewheeling compaction roller 102. The driven scrubbing and drying rollers are presented to the compaction roller 102 at an off-angle (e.g., oblique) orientation to drive a surface scrubbing and surface drying action to remove collections of the ceramic matrix 206 (e.g., ceramic particles 208 and/or suspension media 210) from the cleaning process in order to recondition the compaction roller 102 for continued use in CMC pick, place, and form operations.

Referring FIGS. 2-6, in one or more examples, the system 100 includes at least one of a scrubbing roller 106, a drying roller 110, a scrubbing reservoir 130, a scrubbing wiper 122, a drying reservoir 132, a drying wiper 126, a scrubbing-reservoir supply 136, a source 152 for a cleaning fluid 134, a scrubbing-reservoir drain 138, a drying-reservoir supply 176, a drying-reservoir drain 140, a pump 154, a filter 156, a blower 146, a heater 150, and a roller drive 174.

Referring to FIGS. 2-4 and 6, in one or more examples, the scrubbing roller 106 includes a scrubbing-roller axis 114 and a scrubbing-roller surface 108 that circumscribes the scrubbing-roller axis 114. By rotating the scrubbing roller 106 about the scrubbing-roller axis 114, the scrubbing roller 106 is used to clean the compaction roller 102 by applying the cleaning fluid 134 to the compaction-roller surface 104 of the compaction roller 102 and scrubbing the compaction-roller surface 104 to remove the debris 166 from the compaction-roller surface 104. During cleaning, with the compaction-roller surface 104 of the compaction roller 102 in contact with the scrubbing-roller surface 108 of the scrubbing roller 106, rotation of the scrubbing roller 106 causes rotation of the compaction roller 102 about the compaction-roller axis 168 and linear movement of the compaction roller 102 in a scrubbing direction 170, thereby, advantageously enabling an entirety of the compaction-roller surface 104 to be easily and efficiently cleaned.

Referring to FIGS. 2, 3, 5 and 6, in one or more examples, the drying roller 110 includes a drying-roller axis 118 and a drying-roller surface 112 that circumscribes the drying-roller axis 118. By rotating the drying roller 110 about the drying-roller axis 118, the drying roller 110 is used to dry the compaction roller 102 by removing the cleaning fluid 134 from the compaction-roller surface 104 of the compaction roller 102 and also removing any remaining amounts of the debris 166 from the compaction-roller surface 104. During drying, with the compaction-roller surface 104 of the compaction roller 102 in contact with the drying-roller surface 112 of the drying roller 110, rotation of the drying roller 110 causes rotation of the compaction roller 102 about the compaction-roller axis 168 and linear movement of the compaction roller 102 in a drying direction 172, thereby, advantageously enabling an entirety of the compaction-roller surface 104 to be easily and efficiently dried.

Referring to FIGS. 2-4 and 6, in one or more examples, the scrubbing reservoir 130 serves as a containment vessel that contains the cleaning fluid 134 for application to the scrubbing roller 106 and, thus, application to the compaction roller 102 during cleaning. The scrubbing reservoir 130 also serves as a collection receptable that collects the cleaning fluid 134 and the debris 166, removed from the compaction roller 102 and the scrubbing roller 106 during cleaning.

Referring to FIGS. 2-4 and 6, in one or more examples, the scrubbing wiper 122 serves as a tool that removes the cleaning fluid 134 and the debris 166 from the scrubbing-roller surface 108 of the scrubbing roller 106 and that directs the cleaning fluid 134 and the debris 166 into the scrubbing reservoir 130. In one or more examples, the scrubbing wiper 122 includes a scrubbing-wiper edge 124 and a scrubbing-wiper ramp 142.

Referring to FIGS. 2, 3, 5 and 6, in one or more examples, the drying reservoir 132 serves as a collection receptable that collects the cleaning fluid 134 and the debris 166, removed from the compaction roller 102 and the drying roller 110 during drying.

Referring to FIGS. 2, 3, 5 and 6, in one or more examples, the drying wiper 126 serves as a tool that removes the cleaning fluid 134 and the debris 166 from the drying-roller surface 112 of the drying roller 110 and that that directs the cleaning fluid 134 and the debris 166 into the drying reservoir 132. In one or more examples, the drying wiper 126 includes a drying-wiper edge 128 and a drying-wiper ramp 144. In one or more examples, the drying wiper 126 Removes most of the cleaning fluid 134 and the debris 166 from the drying-roller surface 112 of the drying roller 110, but not all.

Referring to FIGS. 2-4 and 6, in one or more examples, the scrubbing-reservoir supply 136 provides a supply of the cleaning fluid 134 from the source 152 to the scrubbing reservoir 130. In one or more examples, the scrubbing-reservoir drain 138 provides a drain for the cleaning fluid 134 and the debris 166 collected in the scrubbing reservoir 130.

Referring to FIGS. 2, 3 and 5, in one or more examples, the drying-reservoir supply 176 provides a supply of the cleaning fluid 134 from the source 152 to the drying reservoir 132. In one or more examples, the drying-reservoir drain 140 provides a drain for the cleaning fluid 134 and the debris 166 collected in the drying reservoir 132.

Referring to FIGS. 2 and 6, in one or more examples, the pump 154 transfers the cleaning fluid 134 from the source 152 to the scrubbing reservoir 130. In one or more examples, the pump 154 transfers the cleaning fluid 134 from the source 152 to the drying reservoir 132. In one or more examples, the pump 154 removes collected amounts of the cleaning fluid 134 and the debris 166 from the scrubbing reservoir 130. In one or more examples, the pump 154 removes collected amounts of the cleaning fluid 134 and the debris 166 from the drying reservoir 132.

Referring to FIGS. 2 and 6, in one or more examples, the collected amounts of the cleaning fluid 134 and the debris 166 removed from the scrubbing reservoir 130 and/or the drying reservoir 132 are transferred back to the source 152. In these examples, the filter 156 is used to filter the debris 166 from the cleaning fluid 134 before the cleaning fluid 134 is resupplied back to the scrubbing reservoir 130 and/or the drying reservoir 132.

Referring to FIGS. 2, 3, 5 and 6, in one or more examples, the blower 146 is used to direct a gas 148 to or on the drying-roller surface 112 of the drying roller 110 during drying. The gas 148 dries the drying-roller surface 112. In one or more examples, the heater 150 heats the gas 148 before the gas 148 is directed on the drying roller 110.

Referring to FIGS. 2 and 6, in one or more examples, the roller drive 174 drives rotation of at least one of the scrubbing roller 106 about the scrubbing-roller axis 114 and/or the drying roller 110 about the drying-roller axis 118.

Referring particularly to FIG. 1 and generally to FIGS. 2-6, the following are examples of the method 1000, according to the present disclosure. In one or more examples, the method 1000 is implemented using the system 100 (e.g., FIGS. 2-6). The method 1000 includes a number of elements, steps, and/or operations. Not all of the elements, steps, and/or operations described or illustrated in one example are required in that example. Some or all of the elements, steps, and/or operations described or illustrated in one example can be combined with other examples in various ways without the need to include other elements, steps, and/or operations described in those other examples, even though such combination or combinations are not explicitly described or illustrated by example herein.

Referring particularly to FIG. 1 and generally to FIGS. 2-4 and 6, in one or more examples, the method 1000 includes a step of (block 1002) applying the cleaning fluid 134. In one or more examples, the cleaning fluid 134 is applied (block 1002) to the scrubbing roller 106. In these examples, the cleaning fluid 134 is then applied (block 1002) or transferred to the compaction roller 102 via the scrubbing roller 106.

Referring particularly to FIG. 1 and generally to FIGS. 2 and 4, in one or more examples, the method 1000 includes a step of (block 1008) placing the compaction roller 102 in contact with the scrubbing roller 106. In one or more examples, the compaction roller 102 is placed or otherwise positioned in contact with the scrubbing roller 106 such that the compaction-roller axis 168 of the compaction roller 102 is oblique to the scrubbing-roller axis 114 of the scrubbing roller 106.

Referring particularly to FIG. 1 and generally to FIGS. 2 and 4, in one or more examples, with the compaction roller 102 in contact (block 1008) with the scrubbing roller 106 and the compaction-roller axis 168 oblique to the scrubbing-roller axis 114, the method 1000 includes a step of (block 1010) rotating the scrubbing roller 106 about the scrubbing-roller axis 114.

Referring particularly to FIG. 1 and generally to FIGS. 2 and 4, in one or more examples, the method 1000 includes a step of (block 1012) rotating the compaction roller 102 about the compaction-roller axis 168. In one or more examples, the compaction roller 102 rotates (block 1012), or is rotated, about the compaction-roller axis 168 in response to rotating (block 1010) the scrubbing roller 106 with the compaction roller 102 in contact with the scrubbing roller 106. In other words, engagement (block 1008) of the compaction-roller surface 104 with the scrubbing-roller surface 108 while rotating (block 1010) the scrubbing roller 106 results in rotation (block 1012) of the compaction roller 102. However, in other examples, the compaction roller 102 rotates, or is rotated, about the compaction-roller axis 168 under the power of a separate and/or dedicated compaction-roller drive (not shown).

Referring particularly to FIG. 1 and generally to FIG. 4, in one or more examples, the method 1000 includes a step of (block 1014) moving the compaction roller 102 in the scrubbing direction 170. In one or more examples, the compaction roller 102 moves (block 1014), or is moved, in the scrubbing direction 170 in response to rotating (block 1010) the scrubbing roller 106 with the compaction roller 102 in contact (block 1008) with the scrubbing roller 106. In other words, engagement (block 1008) of the compaction-roller surface 104 with the scrubbing-roller surface 108 while rotating (block 1010) the scrubbing roller 106 results in linear movement (block 1014) of the compaction roller 102 in the scrubbing direction 170. However, in other examples, the compaction roller 102 moves, or is moved, in the scrubbing direction 170 under the power of a separate and/or dedicated compaction-roller drive (not shown).

In one or more examples, the scrubbing direction 170 is non-parallel to the scrubbing-roller axis 114. In one or more examples, the scrubbing direction 170 is at least approximately perpendicular to the scrubbing-roller axis 114. In one or more examples, the scrubbing direction 170 is generally oblique to the scrubbing-roller axis 114.

Referring particularly to FIG. 1 and generally to FIGS. 2, 4 and 6, in one or more examples, the method 1000 includes a step of (block 1016) transferring the cleaning fluid 134 from the scrubbing roller 106 to the compaction roller 102. In one or more examples, the cleaning fluid 134 is transferred (block 1016) from the scrubbing roller 106 to the compaction roller 102 while rotating (block 1010) the scrubbing roller 106 and with the compaction-roller surface 104 of the compaction roller 102 in contact (block 1008) with the scrubbing-roller surface 108 of the scrubbing roller 106.

Referring particularly to FIG. 1 and generally to FIGS. 2, 4 and 6, in one or more examples, the method 1000 includes a step of (block 1018) transferring debris 166 from the compaction roller 102 to the scrubbing roller 106. In one or more examples, the debris 166 is transferred (block 1018) from the compaction roller 102 to the scrubbing roller 106 while rotating (block 1010) the scrubbing roller 106 and with the compaction-roller surface 104 of the compaction roller 102 in contact (block 1008) with the scrubbing-roller surface 108 of the scrubbing roller 106.

In one or more examples, the debris 166 includes or consists entirely of the ceramic particles 208 of the ceramic matrix 206. In other examples, the debris 166 includes fragments of the ceramic reinforcement 204, remnants of the suspension media 210, and other debris or foreign objects removed from the compaction-roller surface 104 of the compaction roller 102.

Referring particularly to FIG. 1 and generally to FIGS. 2 and 5, in one or more examples, the method 1000 includes a step of (block 1022) placing the compaction roller 102 in contact with the drying roller 110. In one or more examples, the compaction roller 102 is placed or otherwise positioned in contact with the drying roller 110 such that the compaction-roller axis 168 of the compaction roller 102 is oblique to the drying-roller axis 118 of the drying roller 110.

Referring particularly to FIG. 1 and generally to FIGS. 2 and 5, in one or more examples, with the compaction roller 102 in contact (block 1022) with the drying roller 110 and the compaction-roller axis 168 oblique to the drying-roller axis 118, the method 1000 includes a step of (block 1024) rotating the drying roller 110 about the drying-roller axis 118.

Referring particularly to FIG. 1 and generally to FIGS. 2 and 5, in one or more examples, the method 1000 includes a step of (block 1026) rotating the compaction roller 102 about the compaction-roller axis 168. In one or more examples, the compaction roller 102 rotates (block 1026), or is rotated, about the compaction-roller axis 168 in response to rotating (block 1024) the drying roller 110 with the compaction roller 102 in contact with the drying roller 110. In other words, engagement (block 1022) of the compaction-roller surface 104 with the drying-roller surface 112 while rotating (block 1024) the drying roller 110 results in rotation (block 1026) of the compaction roller 102. However, in other examples, the compaction roller rotates, or is rotated, about the compaction-roller axis 168 under the power of a separate and/or dedicated compaction-roller drive (not shown).

Referring particularly to FIG. 1 and generally to FIG. 5, in one or more examples, the method 1000 includes a step of (block 1028) moving the compaction roller 102 in the drying direction 172. In one or more examples, the compaction roller 102 moves (block 1028), or is moved, in the drying direction 172 in response to rotating (block 1024) the drying roller 110 with the compaction roller 102 in contact (block 1022) with the drying roller 110. In other words, engagement (block 1022) of the compaction-roller surface 104 with the drying-roller surface 112 while rotating (block 1024) the drying roller 110 results in linear movement (block 1028) of the compaction roller 102 in the drying direction 172. However, in other examples, the compaction roller 102 moves, or is moved, in the drying direction 172 under the power of a separate and/or dedicated compaction-roller drive (not shown).

In one or more examples, the drying direction 172 is non-parallel to the drying-roller axis 118. In one or more examples, the drying direction 172 is at least approximately perpendicular to the drying-roller axis 118. In one or more examples, the drying direction 172 is generally oblique to the drying-roller axis 118.

Referring particularly to FIG. 1 and generally to FIGS. 2, 5 and 6, in one or more examples, the method 1000 includes a step of (block 1030) transferring the cleaning fluid 134 and the debris 166 from the compaction roller 102 to the drying roller 110. In one or more examples, the cleaning fluid 134 and the debris 166 are transferred (block 1030) from the compaction roller 102 to the drying roller 110 while rotating (block 1024) the drying roller 110 and with the compaction-roller surface 104 of the compaction roller 102 in contact (block 1022) with the drying-roller surface 112 of the drying roller 110.

Referring particularly to FIG. 1 and generally to FIGS. 2, 4 and 6, in one or more examples, the method 1000 includes a step of (block 1040) collecting the cleaning fluid 134 and the debris 166 from the scrubbing roller 106. In one or more examples, the cleaning fluid 134 and the debris 166, which are removed (block 1036) from the scrubbing roller 106, are collected (block 1040), or otherwise deposited, in the scrubbing reservoir 130.

Referring particularly to FIG. 1 and generally to FIGS. 2-4 and 6, in one or more examples, according to the method 1000, the cleaning fluid 134 is contained in the scrubbing reservoir 130. In one or more examples, the step of (block 1002) applying the cleaning fluid 134 to the scrubbing roller 106 includes a step of (block 1004) submerging a portion of the scrubbing roller 106 in the cleaning fluid 134, which is contained in the scrubbing reservoir 130. In one or more examples, the portion of the scrubbing roller 106 is submerged (block 1004) in the cleaning fluid 134 while rotating (block 1010) the scrubbing roller 106.

Referring particularly to FIG. 1 and generally to FIGS. 2-4 and 6, in one or more examples, the method 1000 includes a step of (block 1036) removing the cleaning fluid 134 and the debris 166 from the scrubbing roller 106. In one or more examples, the cleaning fluid 134 and the debris 166 are removed (block 1036) from the scrubbing-roller surface 108 of the scrubbing roller 106 using the scrubbing wiper 122. A portion of the scrubbing wiper 122 is in contact with the scrubbing-roller surface 108 of the scrubbing roller 106.

Referring particularly to FIG. 1 and generally to FIGS. 2, 4 and 6, in one or more examples, the method 1000 includes a step of (block 1038) directing the cleaning fluid 134 and the debris 166 from the scrubbing roller 106 to the scrubbing reservoir 130. In one or more examples, the cleaning fluid 134 and the debris 166 removed (block 1036) from the scrubbing roller 106 are directed (block 1038) to the scrubbing reservoir 130 using the scrubbing wiper 122.

Referring particularly to FIG. 1 and generally to FIGS. 2-4, in one or more examples, according to the method 1000, the scrubbing wiper 122 includes the scrubbing-wiper edge 124 and the scrubbing-wiper ramp 142. The scrubbing-wiper ramp 142 extends from the scrubbing-wiper edge 124. The scrubbing-wiper ramp 142 extends is directed toward the scrubbing reservoir 130.

Referring particularly to FIG. 1 and generally to FIGS. 2 and 4, in one or more examples, according to the method 1000, the step of (block 1036) removing the cleaning fluid 134 and the debris 166 from the scrubbing roller 106 includes a step of placing the scrubbing-wiper edge 124 in contact with the scrubbing-roller surface 108 of the scrubbing roller 106 and a step of rotating the scrubbing roller 106 with the scrubbing-wiper edge 124 in contact with the scrubbing-roller surface 108.

Referring particularly to FIG. 1 and generally to FIGS. 2 and 4, in one or more examples, according to the method 1000, the step of (block 1038) directing the cleaning fluid 134 and the debris 166 from the scrubbing roller 106 to the scrubbing reservoir 130, via the scrubbing wiper 122, includes a step of urging the cleaning fluid 134 and the debris 166 from the scrubbing-wiper edge 124 along the scrubbing-wiper ramp 142 into the scrubbing reservoir 130.

Referring particularly to FIG. 1 and generally to FIGS. 2, 5 and 6, in one or more examples, the method 1000 includes a step of (block 1050) collecting the cleaning fluid 134 and the debris 166 from the drying roller 110. In one or more examples, the cleaning fluid 134 and the debris 166 removed (block 1046) from the drying roller 110 are collected (block 1050), or otherwise deposited, in the drying reservoir 132.

Referring particularly to FIG. 1 and generally to FIGS. 2 and 5, in one or more examples, the method 1000 includes a step of (block 1046) removing the cleaning fluid 134 and the debris 166 from the drying roller 110. In one or more examples, the cleaning fluid 134 and the debris 166 are removed (block 1046) from the drying-roller surface 112 of the drying roller 110 using the drying wiper 126. A portion of the wiper 126 is in contact with the drying-roller surface 112 of the drying roller 110.

Referring particularly to FIG. 1 and generally to FIGS. 2 and 5, in one or more examples, the method 1000 includes a step of (block 1048) directing the cleaning fluid 134 and the debris 166 from the drying roller 110 to the drying reservoir 132. In one or more examples, the cleaning fluid 134 and the debris 166, which are removed (block 1046) from the drying roller 110, are directed (block 1048) to the drying reservoir 132 using the drying wiper 126.

Referring particularly to FIG. 1 and generally to FIGS. 2 and 5, in one or more examples, according to the method 1000, the drying wiper 126 includes the drying-wiper edge 128 and the drying-wiper ramp 144. The drying-wiper ramp 144 extends from the drying-wiper edge 128. The drying-wiper ramp 144 is directed toward the reservoir 132.

Referring particularly to FIG. 1 and generally to FIGS. 2 and 5, in one or more examples, according to the method 1000, the step of (block 1046) removing the cleaning fluid 134 and the debris 166 from the drying roller 110 includes a step of placing the drying-wiper edge 128 in contact with the drying-roller surface 112 of the drying roller 110 and a step of rotating the drying roller 110 with the drying-wiper edge 128 in contact with the drying-roller surface 112.

Referring particularly to FIG. 1 and generally to FIGS. 2, 5 and 6, in one or more examples, according to the method 1000, the step of (block 1048) directing the cleaning fluid 134 and the debris 166 from the drying roller 110 to the drying reservoir 132, via the drying wiper 126, includes a step of urging the cleaning fluid 134 and the debris 166 from the drying-wiper edge 128 along the drying-wiper ramp 144 into the drying reservoir 132.

Referring particularly to FIG. 1 and generally to FIGS. 2-4 and 6, in one or more examples, the method 1000 includes a step of (block 1034) supplying the cleaning fluid 134 to the scrubbing reservoir 130. Supplying (block 1034) the cleaning fluid 134 to the scrubbing reservoir 130 enables applying (block 1002) the cleaning fluid 134 to the scrubbing roller 106, such as by submerging (block 1004) a portion of the scrubbing roller 106 in the cleaning fluid 134. In one or more examples, the cleaning fluid 134 is supplied to the scrubbing reservoir 130 via the scrubbing-reservoir supply 136.

Referring particularly to FIG. 1 and generally to FIGS. 2-4 and 6, in one or more examples, the method 1000 includes a step of (block 1042) draining the cleaning fluid 134 and the debris 166 from the scrubbing reservoir 130. Draining the cleaning fluid 134 and the debris 166 from the scrubbing reservoir 130 removes the used and collected amounts of the cleaning fluid 134 and amounts of the debris 166 removed and collected from the scrubbing roller 106 and the compaction roller 102. In one or more examples, the cleaning fluid 134 and the debris 166 are drained from the scrubbing reservoir 130 vie the scrubbing-reservoir drain 138.

Referring particularly to FIG. 1 and generally to FIGS. 2, 3 and 5, in one or more examples, the method 1000 includes a step of (block 1052) draining the cleaning fluid 134 and the debris 166 from the drying reservoir 132. Draining the cleaning fluid 134 and the debris 166 from the drying reservoir 132 removes the used and collected amounts of the cleaning fluid 134 and amounts of the debris 166 removed and collected from the drying roller 110 and the compaction roller 102. In one or more examples, the cleaning fluid 134 and the debris 166 are drained from the drying reservoir 132 via the drying-reservoir drain 140.

Referring particularly to FIG. 1 and generally to FIGS. 2, 3, 5 and 6, in one or more examples, the method 1000 includes the step of (block 1034) supplying the cleaning fluid 134 to the drying reservoir 132. Supplying (block 1034) the cleaning fluid 134 to the drying reservoir 132 enables draining (block 1052) by flushing collected amounts of the debris 166 from the reservoir 132. The amount of cleaning fluid 134 supplied to the drying reservoir 132 remains below the drying roller 110. In one or more examples, the cleaning fluid 134 is supplied to the scrubbing reservoir 130 via the drying-reservoir supply 176.

Referring particularly to FIG. 1 and generally to FIGS. 2 and 6, in one or more examples, according to the method 1000, the step of (block 1034) supplying the cleaning fluid 134 to the scrubbing reservoir 130 includes a step of transferring the cleaning fluid 134 from the source 152 to the scrubbing-reservoir supply 136.

Referring particularly to FIG. 1 and generally to FIGS. 2 and 6, in one or more examples, according to the method 1000, the step of transferring the cleaning fluid 134 from the source 152 to the scrubbing-reservoir supply 136 includes a step of pumping the cleaning fluid 134. In one or more examples, the cleaning fluid 134 is pumped from the source 152 to the scrubbing-reservoir supply 136 using the pump 154, such as an airlift pump.

Referring particularly to FIG. 1 and generally to FIGS. 2 and 6, in one or more examples, the method 1000, such as the step of (block 1042) draining the cleaning fluid 134 and the debris 166 from the scrubbing reservoir 130, includes a step of (block 1044) transferring the cleaning fluid 134 and the debris 166 from the scrubbing-reservoir drain 138 to the source 152.

Referring particularly to FIG. 1 and generally to FIGS. 2, 5 and 6, in one or more examples, according to the method 1000, the step of (block 1034) supplying the cleaning fluid 134 to the drying reservoir 132 includes a step of transferring the cleaning fluid 134 from the source 152 to the drying-reservoir supply 176.

Referring particularly to FIG. 1 and generally to FIGS. 2, 5 and 6, in one or more examples, according to the method 1000, the step of transferring the cleaning fluid 134 from the source 152 to the drying-reservoir supply 176 includes a step of pumping the cleaning fluid 134. In one or more examples, the cleaning fluid 134 is pumped from the source 152 to the drying-reservoir supply 176 using the pump 154, such as an airlift pump.

Referring particularly to FIG. 1 and generally to FIGS. 2 and 6, in one or more examples, the method 1000, such as the step of (block 1052) draining the cleaning fluid 134 and the debris 166 from the drying reservoir 132, includes a step of (block 1054) transferring the cleaning fluid 134 and the debris 166 from the drying-reservoir drain 140 to the source 152.

Referring particularly to FIG. 1 and generally to FIGS. 2 and 6, in one or more examples, the method 1000 includes a step of (block 1032) filtering the debris 166 from the cleaning fluid 134. In one or more examples, the debris 166 is filtered (block 1032) from the cleaning fluid 134 in the source 152. In one or more examples, the debris 166 is filter and removed from the cleaning fluid 134 using the filter 156.

Referring particularly to FIG. 1 and generally to FIGS. 2 and 5, in one or more examples, the method 1000 includes a step of (block 1056) drying the drying roller 110.

Referring particularly to FIG. 1 and generally to FIGS. 2 and 5, in one or more examples, according to the method 1000, the step of (block 1056) drying the drying roller 110 includes a step of (block 1060) directing gas 148 on the drying roller 110. In one or more examples, the gas 148 is directed (block 1060) on the drying-roller surface 112 of the drying roller 110 while rotating (block 1024) the drying roller 110. In one or more examples, the gas 148 is directed on the drying-roller surface 112 of the drying roller 110 using the blower 146.

Referring particularly to FIG. 1 and generally to FIGS. 2 and 5, in one or more examples, the method 1000 includes a step of (block 1058) heating the gas 148. In one or more examples, the gas 148 is heated using the heater 150 before the gas 148 is supplied or routed to the blower 146.

Referring particularly to FIG. 1 and generally to FIGS. 2-6, in one or more examples, the method 1000 includes the step of (block 1002) applying the cleaning fluid 134. In one or more examples, the cleaning fluid 134 is applied (block 1002) to the compaction roller 102. In one or more examples, the cleaning fluid 134 is applied (block 1002) to the scrubbing roller 106 and then is applied or transferred to the compaction roller 102 via the scrubbing roller 106. In other examples, the cleaning fluid 134 is applied directly to the compaction roller 102.

Referring particularly to FIG. 1 and generally to FIGS. 2-4 and 6, in one or more examples, the method 1000 includes the step of (block 1006) scrubbing the compaction roller 102 to remove the ceramic particles 208 of the ceramic matrix 206 from the compaction-roller surface 104 of the compaction roller 102.

Referring particularly to FIG. 1 and generally to FIGS. 2, 3, 5 and 6, in one or more examples, the method 1000 includes the step of (block 1020) drying the compaction roller 102 to remove the cleaning fluid 134 from the compaction-roller surface 104.

Referring particularly to FIG. 1 and generally to FIGS. 2-4 and 6, in one or more examples, according to the method 1000, the step of (block 1006) scrubbing the compaction roller 102 includes the step of (block 1008) placing the compaction roller 102 in contact with the scrubbing roller 106 such that the compaction-roller axis 168 of the compaction roller 102 is oblique to the scrubbing-roller axis 114 of the scrubbing roller 106.

Referring particularly to FIG. 1 and generally to FIGS. 2-4 and 6, in one or more examples, with the compaction roller 102 in contact (block 1008) with the scrubbing roller 106 and the compaction-roller axis 168 oblique to the scrubbing-roller axis 114, the step of (block 1006) scrubbing the compaction roller 102 includes the step of (block 1010) rotating the scrubbing roller 106 about the scrubbing-roller axis 114.

Referring particularly to FIG. 1 and generally to FIGS. 2-4 and 6, in one or more examples, the step of (block 1006) scrubbing the compaction roller 102 includes the step of (block 1012) rotating the compaction roller 102 about the compaction-roller axis 168 in response to rotating (block 1010) the scrubbing roller 106.

Referring particularly to FIG. 1 and generally to FIGS. 2-4 and 6, in one or more examples, the step of (block 1006) scrubbing the compaction roller 102 includes the step of (block 1014) moving the compaction roller 102 in the scrubbing direction 170 in response to rotating (block 1010) the scrubbing roller 106. In one or more examples, the scrubbing direction 170 is non-parallel to the scrubbing-roller axis 114.

Referring particularly to FIG. 1 and generally to FIGS. 2-4 and 6, in one or more examples, the step of (block 1006) scrubbing the compaction roller 102 includes the step of (block 1016) transferring the cleaning fluid 134 from the scrubbing roller 106 to the compaction roller 102 while rotating (block 1010) the scrubbing roller 106.

Referring particularly to FIG. 1 and generally to FIGS. 2-4 and 6, in one or more examples, the step of (block 1006) scrubbing the compaction roller 102 includes the step of (block 1018) transferring the debris 166 from the compaction roller 102 to the scrubbing roller 106 while rotating (block 1010) the scrubbing roller 106.

Referring particularly to FIG. 1 and generally to FIGS. 2, 3 5 and 6, in one or more examples, the step of (block 1020) drying the compaction roller 102 includes the step of (block 1022) placing the compaction roller 102 in contact with the drying roller 110 such that the compaction-roller axis 168 of the compaction roller 102 is oblique to the drying-roller axis 118 of the drying roller 110.

Referring particularly to FIG. 1 and generally to FIGS. 2, 3 5 and 6, in one or more examples, with the compaction roller 102 in contact (block 1022) with the drying roller 110 and the compaction-roller axis 168 oblique to the drying-roller axis 118, the step of (block 1020) drying the compaction roller 102 includes the step of (block 1024) rotating the drying roller 110 about the drying-roller axis 118;

Referring particularly to FIG. 1 and generally to FIGS. 2, 3 5 and 6, in one or more examples, the step of (block 1020) drying the compaction roller 102 includes the step of (block 1026) rotating the compaction roller 102 about the compaction-roller axis 168 in response to rotating (block 1024) the drying roller 110.

Referring particularly to FIG. 1 and generally to FIGS. 2, 3 5 and 6, in one or more examples, the step of (block 1020) drying the compaction roller 102 includes the step of (block 1028) moving the compaction roller 102 in the drying direction 172 in response to rotating (block 1024) the drying roller 110. In one or more examples, the drying direction 172 is non-parallel to the drying-roller axis 118.

Referring particularly to FIG. 1 and generally to FIGS. 2, 3 5 and 6, in one or more examples, the step of (block 1020) drying the compaction roller 102 includes the step of (block 1030) transferring the cleaning fluid 134 and debris 166 from the compaction roller 102 to the drying roller 110 while rotating (block 1024) the drying roller 110.

Referring now to FIGS. 2-6, the following are examples of the system 100, according to the present disclosure. The system 100 includes a number of elements, features, and components. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Referring generally to FIG. 2 and particularly to FIGS. 3-6, in one or more examples, the system 100 includes the scrubbing roller 106. The scrubbing roller 106 rotates about the scrubbing-roller axis 114 to apply the cleaning fluid 134 to the compaction roller 102 and to remove the debris 166 from the compaction roller 102.

Referring generally to FIG. 2 and particularly to FIGS. 3-6, in one or more examples, the system 100 includes the drying roller 110. The drying roller 110 rotates about the drying-roller axis 118 to remove the cleaning fluid 134 and the debris 166 from the compaction roller 102.

Referring generally to FIG. 2 and particularly to FIGS. 3-4 and 6, in one or more examples, with the compaction roller 102 placed in contact with the scrubbing roller 106 and the scrubbing-roller axis 114 oblique to the compaction-roller axis 168 of the compaction roller 102, rotation of the scrubbing roller 106 about the scrubbing-roller axis 114 rotates the compaction roller 102 about the compaction-roller axis 168 and moves the compaction roller 102 in the scrubbing direction 170. In one or more examples, the scrubbing direction 170 is non-parallel to the scrubbing-roller axis 114.

Referring generally to FIG. 2 and particularly to FIGS. 3, 5 and 6, in one or more examples, with the compaction roller 102 placed in contact with the drying roller 110 and the drying-roller axis 118 oblique to the compaction-roller axis 168 of the compaction roller 102, rotation of the drying roller 110 about the drying-roller axis 118 rotates the compaction roller 102 about the compaction-roller axis 168 and moves the compaction roller 102 in the drying direction 172. In one or more examples, the drying direction 172 is non-parallel to the drying-roller axis 118.

Referring generally to FIG. 2 and particularly to FIGS. 3-6, in one or more examples, the system 100 includes the scrubbing reservoir 130. The scrubbing reservoir 130 provides the cleaning fluid 134 to the scrubbing roller 106. The scrubbing reservoir 130 collects the cleaning fluid 134 and the debris 166, which are removed from the scrubbing roller 106.

Referring generally to FIG. 2 and particularly to FIGS. 3-6, in one or more examples, the system 100 includes the scrubbing wiper 122. The scrubbing wiper 122 is in contact with the scrubbing roller 106. The scrubbing wiper 122 removes the cleaning fluid 134 and the debris 166 from the scrubbing roller 106. The scrubbing wiper 122 directs the cleaning fluid 134 and the debris 166 into the scrubbing reservoir 130.

Referring generally to FIG. 2 and particularly to FIGS. 3-6, in one or more examples, the scrubbing wiper 122 includes the scrubbing-wiper edge 124 and the scrubbing-wiper ramp 142. The scrubbing-wiper edge 124 is positioned in contact with the scrubbing-roller surface 108 of the scrubbing roller 106. The scrubbing-wiper edge 124 removes the cleaning fluid 134 and the debris 166 from the scrubbing-roller surface 108. The scrubbing-wiper ramp 142 extends from the scrubbing-wiper edge 124. The scrubbing-wiper ramp 142 directs the cleaning fluid 134 and the debris 166, removed from the scrubbing-roller surface 108, to the scrubbing reservoir 130.

Referring to FIG. 2, in one or more examples, the scrubbing-wiper edge 124 is radiused. The scrubbing-wiper edge 124 being radiused, such as having a rounded or curved edge, enables the scrubbing-wiper edge 124 to serve as a squeegee or wiper that presses against the scrubbing-roller surface 108 of the scrubbing roller 106 to remove the debris 166.

Referring generally to FIG. 2 and particularly to FIGS. 3 and 4, in one or more examples, a portion of the scrubbing roller 106 is submerged in the cleaning fluid 134, which is contained in the scrubbing reservoir 130.

Referring generally to FIG. 2 and particularly to FIGS. 3-6, in one or more examples, the system 100 includes the drying reservoir 132. The reservoir 132 collects the cleaning fluid 134 and the debris 166, which are removed from the drying roller 110.

Referring generally to FIG. 2 and particularly to FIGS. 3-6, in one or more examples, the system 100 includes the drying wiper 126. The drying wiper 126 is in contact with the drying roller 110. The drying wiper 126 removes the cleaning fluid 134 and the debris 166 from the drying roller 110. The drying wiper 126 directs the cleaning fluid 134 and the debris 166 into the drying reservoir 132.

Referring generally to FIG. 2 and particularly to FIGS. 3, 5 and 6, in one or more examples, the drying wiper 126 includes the drying-wiper edge 128 and the drying-wiper ramp 144. The drying-wiper edge 128 is positioned in contact with the drying-roller surface 112 of the drying roller 110. The drying-wiper edge 128 removes the cleaning fluid 134 and the debris 166 from the drying-roller surface 112. The drying-wiper ramp 144 extends from the drying-wiper edge 128. The drying-wiper ramp 144 directs the cleaning fluid 134 and the debris 166, removed from the drying-roller surface 112, to the drying reservoir 132.

Referring to FIG. 2, in one or more examples, the drying-wiper edge 128 is radiused. The drying-wiper edge 128 being radiused, such as having a rounded or curved edge, enables the drying-wiper edge 128 to serve as a squeegee or wiper that presses against the drying-roller surface 112 of the drying roller 110 to remove the cleaning fluid 134 and any amounts of the debris 166.

Referring generally to FIG. 2 and particularly to FIGS. 3-6, in one or more examples, the system 100 includes the scrubbing-reservoir supply 136. The scrubbing-reservoir supply 136 supplies the cleaning fluid 134 to the scrubbing reservoir 130.

Referring generally to FIG. 2 and particularly to FIGS. 3-6, in one or more examples, the system 100 includes the source 152 of the cleaning fluid 134. In one or more examples, the source 152 is in fluid communication with the scrubbing-reservoir supply 136.

Referring generally to FIG. 2 and particularly to FIGS. 3-6, in one or more examples, the system 100 includes the scrubbing-reservoir drain 138. The scrubbing-reservoir drain 138 removes the cleaning fluid 134 and the debris 166 from the scrubbing reservoir 130.

Referring generally to FIG. 2 and particularly to FIGS. 3-5, in one or more examples, the system 100 includes the drying-reservoir drain 140. The drying-reservoir drain 140 removes the cleaning fluid 134 and the debris 166 from the drying reservoir 132.

Referring generally to FIG. 2 and particularly to FIGS. 3-6, in one or more examples, the system 100 includes the drying-reservoir supply 176. The drying-reservoir supply 176 supplies the cleaning fluid 134 to the drying reservoir 132. In one or more examples, the source 152 is in fluid communication with the drying-reservoir supply 176.

Referring generally to FIG. 2 and particularly to FIGS. 5 and 6, in one or more examples, the system 100 includes the pump 154. In one or more examples, the pump 154 transfers the cleaning fluid 134 from the source 152 to the scrubbing reservoir 130 via the scrubbing-reservoir supply 136. In one or more examples, the pump 154 transfers the cleaning fluid 134 from the source 152 to the reservoir 132 via the drying-reservoir supply 176.

In one or more examples, the pump 154 removes the cleaning fluid 134 and the debris 166 from the scrubbing reservoir 130 via the scrubbing-reservoir drain 138. In one or more examples, the pump 154 transfers the cleaning fluid 134 and the debris 166 from the scrubbing reservoir 130 to the source 152. In one or more examples, the pump 154 removes the cleaning fluid 134 and the debris 166 from the drying reservoir 132 via the drying-reservoir drain 140. In one or more examples, the pump 154 transfers the cleaning fluid 134 and the debris 166 from the drying reservoir 132 to the source 152.

Referring to FIG. 2, in one or more examples, the pump 154 includes or takes the form of an airlift pump. Generally, the airlift pump is a pump that has low suction and moderate discharge of liquid and entrained solids. The pump injects compressed air at the bottom of the discharge pipe, which is immersed in the cleaning fluid 134. The compressed air mixes with the liquid causing the air-water mixture to be less dense than the rest of the liquid around it and therefore is displaced upwards through the discharge pipe by the surrounding liquid of higher density. Solids, such as the debris 166, may be entrained in the flow and if small enough to fit through the pipe, will be discharged with the rest of the flow at a shallower depth or above the surface.

Referring generally to FIG. 2 and particularly to FIG. 6, in one or more examples, the source 152 of the cleaning fluid 134 is in fluid communication with the scrubbing-reservoir drain 138.

Referring generally to FIG. 2 and particularly to FIG. 6, in one or more examples, the system 100 includes the filter 156. The filter 156 separates the debris 166 from the cleaning fluid 134 in the source 152.

Referring generally to FIG. 2 and particularly to FIG. 6, in one or more examples, the source 152 of the cleaning fluid 134 is in fluid communication with the drying-reservoir drain 140.

Referring generally to FIG. 2 and particularly to FIGS. 3-6, in one or more examples, the system 100 includes the blower 146. The blower 146 is located adjacent to the drying roller 110. The blower 146 directs the gas 148 on the drying-roller surface 112 of the drying roller 110.

Referring generally to FIG. 2 and particularly to FIGS. 3-6, in one or more examples, the system 100 includes a heater 150. The heater 150 heats the gas 148. In one or more examples, the heater 150 is an inline heater that heats the gas 148 before and/or as the gas 148 is supplied to the blower 146.

Referring generally to FIG. 2 and particularly to FIG. 6, in one or more examples, the system 100 includes the roller drive 174. The roller drive 174 drives and, thereby, rotates the scrubbing roller 106 and the drying roller 110. In one or more examples, the roller drive 174 drives rotation of both the scrubbing roller 106 and the drying roller 110. In one or more examples, the scrubbing roller 106 and the drying roller 110 share a common instance of the roller drive 174.

In one or more examples, the scrubbing roller 106 and the drying roller 110 have a dedicated instances of the roller drive 174.

Referring to FIG. 2, in one or more examples, the scrubbing roller 106 includes the scrubbing-roller surface 108. The scrubbing-roller surface 108 includes a first fabric material 158. The first fabric material 158 has a first nap 162. The first nap 162 is configured to carry the cleaning fluid 134 from the scrubbing reservoir 130. The first nap 162 is also configured to carry the debris 166 collected from the compaction-roller surface 104 of the compaction roller 102. In one or more examples, the first nap 162 is between approximately 10 mm and approximately 26 mm, such as between approximately 15 mm and approximately 18 mm. In one or more examples, the first fabric material 158 includes woven or knit synthetic or natural material or foam material.

Referring to FIG. 2, in one or more examples, the drying roller 110 includes the drying-roller surface 112. The drying-roller surface 112 includes a second fabric material 160. The second fabric material 160 has a second nap 164. The second nap 164 is configured to carry the cleaning fluid 134 collected from the compaction-roller surface 104 of the compaction roller 102. In one or more examples, the second nap 164 is between approximately 3 mm and approximately 9 mm, such as between approximately 5 mm and approximately 7 mm. In one or more examples, the second fabric material 160 includes woven or knit synthetic or natural material or foam material.

Figure 7:
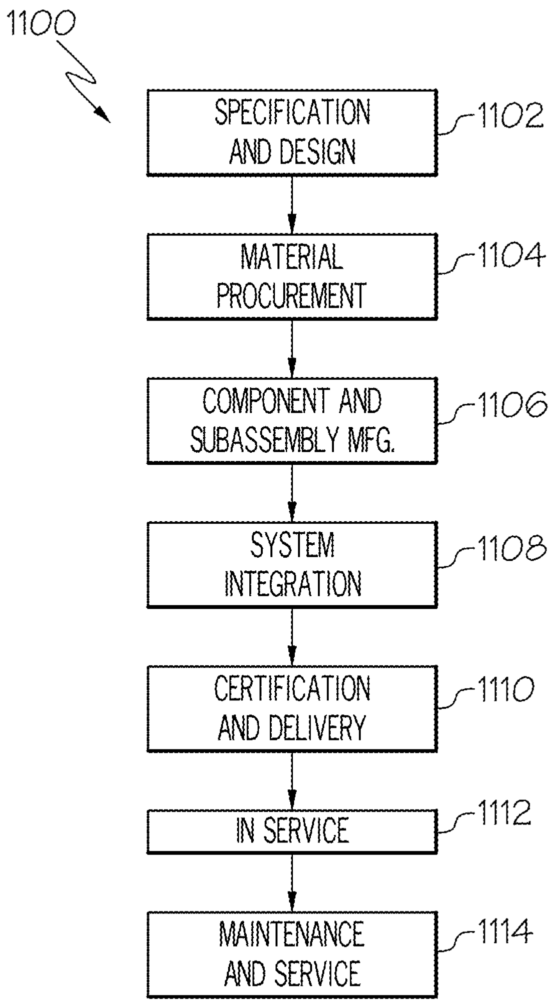
FIG. 7 is a flow diagram of an example of an aircraft manufacturing and service method.
Figure 8:
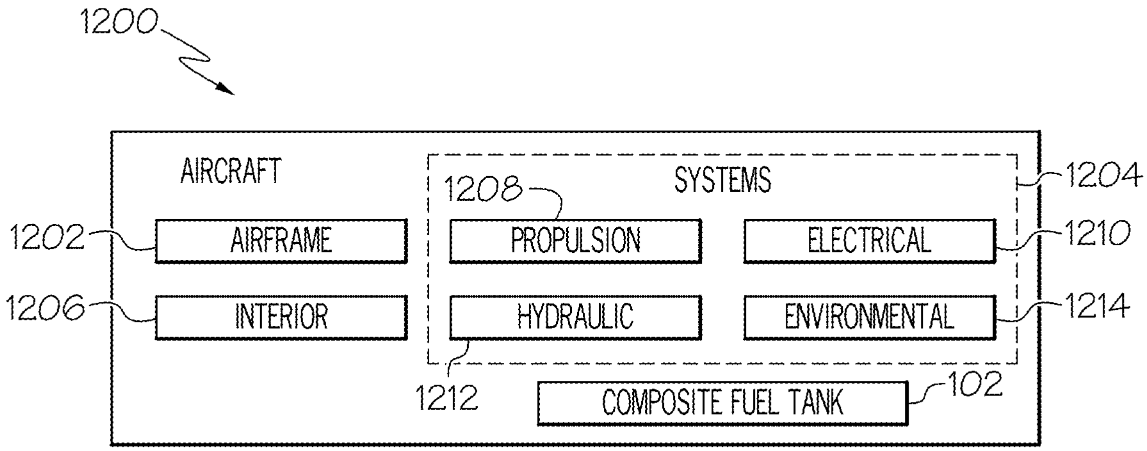
FIG. 8 is a schematic block diagram of an example of an aircraft.

Referring now to FIGS. 7 and 8, examples of the method 1000 and the system 100 described herein, may be related to, or used in the context of, the aerospace manufacturing and service method 1100, as shown in the flow diagram of FIG. 7 and an aircraft 1200, as schematically illustrated in FIG. 8. As an example, the aircraft 1200 and/or the manufacturing and service method 1100 may include or utilize components that are manufactured of ceramic matrix composite materials, which are compacted using the compaction roller 102, which is cleaned during manufacturing using the system 100 and/or according to the method 1000.

Referring to FIG. 8, which illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems, such as, but not limited to, communications systems, avionics systems, software distribution systems, network communications systems, passenger information/entertainment systems, guidance systems, radar systems, weapons systems, and the like. The aircraft 1200 can have any number of components made of ceramic matrix composite materials, which are compacted using the compaction roller 102, which is cleaned using system 100 and/or according to the method 1000.

Referring to FIG. 7, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 7 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the method 1000 and the system 100, shown and described herein, may be employed during any one or more of the stages of the manufacturing and service method 1100 shown in the flow diagram illustrated by FIG. 7. In an example, components of the aircraft 1200 can be manufactured of ceramic matrix composite materials, which are compacted using the compaction roller 102, which is cleaned using the system 100 and/or according to the method 1000 during a portion of component and subassembly manufacturing (block 1106) and/or system integration (block 1108). Further, components of the aircraft 1200 can be manufactured of ceramic matrix composite materials, which are compacted using the compaction roller 102, which is cleaned using the system 100 and/or according to the method 1000 while the aircraft 1200 is in service (block 1112). Also, components of the aircraft 1200 can be manufactured of ceramic matrix composite materials, which are compacted using the compaction roller 102, which is cleaned using the system 100 and/or according to the method 1000 during system integration (block 1108) and certification and delivery (block 1110). Similarly, components of the aircraft 1200 can be manufactured of ceramic matrix composite materials, which are compacted using the compaction roller 102, which is cleaned using the system 100 and/or according to the method 1000 while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word “a” or “an” should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to “example” means that one or more feature, structure, element, component, characteristic, and/or operational step described in connection with the example is included in at least one aspect, embodiment, and/or implementation of the subject matter according to the present disclosure. Thus, the phrases “an example,” “another example,” “one or more examples,” and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 2-6 and 8, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 2-6 and 8, referred to above, need be included in every example and not all elements, features, and/or components described herein are necessarily depicted in each illustrative example. Accordingly, some of the elements, features, and/or components described and illustrated in FIGS. 2-6 and 8 may be combined in various ways without the need to include other features described and illustrated in FIGS. 2-6 and 8, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 2-6 and 8, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 2-6 and 8, and such elements, features, and/or components may not be discussed in detail herein with reference to each of FIGS. 2-6 and 8. Similarly, all elements, features, and/or components may not be labeled in each of FIGS. 2-6 and 8, but reference numerals associated therewith may be utilized herein for consistency.

In FIGS. 1 and 7, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 1 and 7 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100 and the method 1000 have been shown and described, modifications may occur to those skilled in the art upon reading the specification. The present application includes such modifications and is limited only by the scope of the claims.

What is claimed is:

1. A method for removing a ceramic matrix from a compaction roller, the method comprising:

applying a cleaning fluid to a scrubbing roller;

placing the compaction roller in contact with the scrubbing roller such that a compaction-roller axis of the compaction roller is oblique to a scrubbing-roller axis of the scrubbing roller;

with the compaction roller in contact with the scrubbing roller and the compaction-roller axis oblique to the scrubbing-roller axis, rotating the scrubbing roller about the scrubbing-roller axis;

rotating the compaction roller about the compaction-roller axis in response to rotating of the scrubbing roller;

moving the compaction roller in a scrubbing direction that is non-parallel to the scrubbing-roller axis in response to rotating the scrubbing roller;

transferring the cleaning fluid from the scrubbing roller to the compaction roller while rotating the scrubbing roller;

transferring debris from the compaction roller to the scrubbing roller while rotating the scrubbing roller;

placing the compaction roller in contact with a drying roller such that the compaction-roller axis of the compaction roller is oblique to a drying-roller axis of the drying roller;

with the compaction roller in contact with the drying roller and the compaction-roller axis oblique to the drying-roller axis, rotating the drying roller about the drying-roller axis;

rotating the compaction roller about the compaction-roller axis in response to rotating of the drying roller;

moving the compaction roller in a drying direction that is perpendicular to the drying-roller axis in response to rotating the drying roller; and transferring the cleaning fluid and the debris from the compaction roller to the drying roller while rotating the drying roller.

2. The method of claim 1, further comprising collecting the cleaning fluid and the debris from the scrubbing roller in a scrubbing reservoir.

3. The method of claim 2, wherein:

the cleaning fluid is contained in the scrubbing reservoir; and applying the cleaning fluid to the scrubbing roller comprises submerging a portion of the scrubbing roller in the cleaning fluid contained in the scrubbing reservoir while rotating the scrubbing roller.

4. The method of claim 2, further comprising:

removing the cleaning fluid and the debris from the scrubbing roller using a scrubbing wiper that is in contact with the scrubbing roller; and directing the cleaning fluid and the debris from the scrubbing wiper to the scrubbing reservoir.

5. The method of claim 2, further comprising collecting the cleaning fluid and the debris from the drying roller in a drying reservoir.

6. The method of claim 5, further comprising:

removing the cleaning fluid and the debris from the drying roller using a drying wiper that is in contact with the drying roller; and directing the cleaning fluid and the debris from the drying wiper to the drying reservoir.

7. The method of claim 1, wherein the debris comprises:

particles of the ceramic matrix made of a ceramic matrix composite material that is compacted using the compaction roller; and fragments of a ceramic reinforcement of the ceramic matrix composite material.

8. The method of claim 7, wherein:

the ceramic matrix comprises at least one of a carbon matrix, a silicon carbide matrix, an alumina matrix, an alumina silica matrix, an aluminum nitride matrix, a silicon nitride matrix, a mullite matrix, a geo-polymer matrix and a zirconia matrix; and the ceramic reinforcement comprises at least one of carbon reinforcement fibers, silicon carbide reinforcement fibers, alumina reinforcement fibers, alumina silica reinforcement fibers, aluminum nitride reinforcement fibers, silicon nitride reinforcement fibers, mullite reinforcement fibers, silica/quartz reinforcement fibers, basalt reinforcement fibers, and zirconia reinforcement fibers.

9. A method for cleaning a compaction roller, the method comprising:

placing the compaction roller in contact with a scrubbing roller wetted with a cleaning fluid such that a compaction-roller axis of the compaction roller is oblique to a scrubbing-roller axis of the scrubbing roller;

with the compaction roller in contact with the scrubbing roller and the compaction-roller axis oblique to the scrubbing-roller axis, rotating the scrubbing roller about the scrubbing-roller axis, rotating the compaction roller about the compaction-roller axis in response to rotating of the scrubbing roller, and moving the compaction roller in a scrubbing direction that is non-parallel to the scrubbing-roller axis in response to rotating the scrubbing roller;

placing the compaction roller in contact with a drying roller such that the compaction-roller axis of the compaction roller is oblique to a drying-roller axis of the drying roller; and with the compaction roller in contact with the drying roller and the compaction-roller axis oblique to the drying-roller axis, rotating the drying roller about the drying-roller axis, rotating the compaction roller about the compaction-roller axis in response to rotating of the drying roller, and moving the compaction roller in a drying direction that is perpendicular to the drying-roller axis in response to rotating the drying roller.

10. The method of claim 9, further comprising:

transferring the cleaning fluid from the scrubbing roller to the compaction roller while rotating the scrubbing roller; and transferring debris from the compaction roller to the scrubbing roller while rotating the scrubbing roller.

11. The method of claim 9, further comprising transferring the cleaning fluid from the scrubbing roller to the compaction roller while rotating the scrubbing roller.

12. The method of claim 11, further comprising collecting the cleaning fluid in a scrubbing reservoir.

13. The method of claim 9, further comprising transferring debris from the compaction roller to the scrubbing roller while rotating the scrubbing roller.

14. The method of claim 13, further comprising collecting the debris in a scrubbing reservoir.

15. The method of claim 9, further comprising applying the cleaning fluid to the scrubbing roller by submerging a portion of the scrubbing roller in the cleaning fluid contained in a scrubbing reservoir while rotating the scrubbing roller.

16. The method of claim 9, further comprising:

removing the cleaning fluid and debris from the scrubbing roller using a scrubbing wiper that is in contact with the scrubbing roller; and directing the cleaning fluid and the debris from the scrubbing wiper to a scrubbing reservoir.

17. The method of claim 9, further comprising:

transferring the cleaning fluid and debris from the compaction roller to the drying roller while rotating the drying roller; and collecting the cleaning fluid and the debris from the drying roller in a drying reservoir.

18. The method of claim 9, further comprising:

removing the cleaning fluid and debris from the drying roller using a drying wiper that is in contact with the drying roller; and directing the cleaning fluid and the debris from the drying wiper to the drying reservoir.

19. The method of claim 9, further comprising directing a heated gas onto the drying roller while rotating the drying roller to dry the drying roller.

20. A method for cleaning a compaction roller having a compaction-roller axis and a compaction-roller surface, the compaction roller having debris on the compaction-roller surface, the method comprising:

submerging a portion of a scrubbing roller in a cleaning fluid contained in a scrubbing reservoir, the scrubbing roller having a scrubbing-roller axis and a scrubbing-roller surface comprising a first fabric material having a first nap;

placing the compaction roller in contact with the scrubbing roller such that the compaction-roller axis is oblique to the scrubbing-roller axis;

rotating the scrubbing roller about the scrubbing-roller axis, wherein rotating the scrubbing roller with the compaction-roller axis oblique to the scrubbing-roller axis:

rotates the compaction roller about the compaction-roller axis, moves the compaction roller in a scrubbing direction that is non-parallel to the scrubbing-roller axis, transfers the cleaning fluid from the scrubbing-roller surface to the compaction-roller surface, and transfers the debris from the compaction-roller surface to the scrubbing-roller surface;

removing the cleaning fluid and the debris from the scrubbing-roller surface using a scrubbing wiper in contact with the scrubbing roller, the scrubbing wiper comprising a scrubbing-wiper edge and a scrubbing-wiper ramp extending from the scrubbing-wiper edge toward the scrubbing reservoir;

directing the cleaning fluid and the debris from the scrubbing-wiper edge along the scrubbing-wiper ramp into the scrubbing reservoir;

placing the compaction roller in contact with a drying roller such that the compaction-roller axis is oblique to a drying-roller axis of the drying roller, the drying roller having a drying-roller surface comprising a second fabric material having a second nap;

rotating the drying roller about the drying-roller axis, wherein rotating the drying roller with the compaction-roller axis oblique to the drying-roller axis:

rotates the compaction roller about the compaction-roller axis, moves the compaction roller in a drying direction that is non-parallel to the drying-roller axis, and transfers the cleaning fluid and the debris from the compaction-roller surface to the drying-roller surface;

directing a heated gas onto the drying-roller surface of the drying roller while rotating the drying roller to dry the drying-roller surface;

removing the cleaning fluid and the debris from the drying-roller surface using a drying wiper in contact with the drying roller, the drying wiper comprising a drying-wiper edge and a drying-wiper ramp extending from the drying-wiper edge toward a drying reservoir;

directing the cleaning fluid and the debris from the drying-wiper edge along the drying-wiper ramp into the drying reservoir;

draining the cleaning fluid and the debris from the scrubbing reservoir and from the drying reservoir to a source of the cleaning fluid; and filtering the debris from the cleaning fluid in the source to recondition the cleaning fluid for reuse.

* * * * *